UNITED STATES PATENT OFFICE.

HERBERT LEVINSTEIN AND JAMES BADDILEY, OF BLACKLEY, MANCHESTER, ENGLAND, ASSIGNORS TO LEVINSTEIN, LIMITED, OF BLACKLEY, MANCHESTER, ENGLAND, A LIMITED LIABILITY COMPANY.

AZO DYESTUFFS AND THEIR PRODUCTION.

1,092,842.  Specification of Letters Patent.  Patented Apr. 14, 1914.

No Drawing.  Application filed May 20, 1912. Serial No. 698,492.

*To all whom it may concern:*

Be it known that we, HERBERT LEVINSTEIN, M. Sc., Ph. D., and JAMES BADDILEY, B. Sc., both subjects of the King of Great Britain and Ireland, and both residents of Blackley, Manchester, in the county of Lancaster, England, have invented new and useful New Azo Dyestuffs and Their Production, of which the following is a specification.

This invention relates to the production of new mono and disazo dyestuffs and consists in combining diazo or diazoazo bodies of the benzene and naphthalene series with the new azo dyestuff components produced by combining brom- or chlor-acetylchlorid with an amino-naphthol sulfonic acid which does not contain the amino group in the ortho position to the hydroxyl group, and with a primary aromatic amino body. When the hydroxyl group is in the alpha position the peri position is equivalent to the ortho position and must remain unoccupied by the amino group, and any reference hereinafter to the amino group not being in the ortho position to the hydroxyl group is intended also to include a reference to the peri position when the hydroxyl group is in the alpha position.

The dyestuff components may be produced in two series, according to whether the amino-naphthol-sulfonic acid or the primary aromatic amino body is first combined with the halogen acetylchlorid. These two series have the following general formula

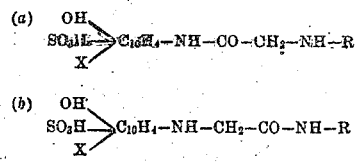

where "X" may represent hydrogen or a sulfonic group in the naphthalene nucleus and "R" the residue of the primary aromatic amin.

The following examples will serve to illustrate how our invention may be carried into effect, but we do not confine ourselves to the examples given, which can be varied within wide limits, nor to the exact proportions, quantities, and conditions described in the said examples.

Example 1: 233 parts of 2.6 naphthylamin sulfonic acid are diazotized by means of 69 parts of sodium nitrite and the requisite amount of hydrochloric acid, and the diazo compound thus obtained is combined with 372 parts of 2-phenylaminoacetylamino-5-naphthol-7-sulfonic acid having the constitution $$C_{10}H_5(SO_3H)(OH).NH.CO.CH_2.NH.C_6H_5$$

dissolved in water in the presence of an excess of sodium carbonate. When the combination is completed the solution is heated and the dyestuff isolated by means of salt. It dissolves in water with a clear red color and dyes unmordanted cotton in yellowish red shades of great fastness to acids and good fastness to light.

Example 2: 303 parts of 2-naphthylamin-3.6-disulfonic acid are diazotized in the usual way and combined with 121 parts of paraxylidin. The intermediate product thus formed is isolated by salting out from the solution made mineral acid with hydrochloric acid, transformed into its sodium salt, and rediazotized by means of 69 parts of sodium nitrite and the necessary amount of hydrochloric acid. The diazoazo compound is then combined with 372 parts of the anilid of 2-amino-5-naphthol-7-sulfonic acid glycin having the constitution $$C_{10}H_5(SO_3H)(OH).NH.CH_2.CO.NH.C_6H_5$$

in the presence of an excess of sodium carbonate. The resulting dystuff is isolated in the usual way. It dyes unmordanted cotton in reddish violet shades of good fastness to acids, alkalis, and light.

Example 3: 223 parts of 2-naphthylamin-6-sulfonic acid are diazotized as in Example 1, and combined in the presence of an excess of sodium carbonate with 417 parts of 2-metanitrophenylaminoacetylamino-5-naphthol-7-sulfonic acid of the following constitution

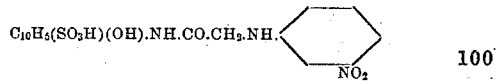

When the combination is completed the solution is heated up and the dyestuff salted out. It dyes cotton in very bright yellowish red shades of great fastness to acids and good fastness to light.

The nitro group in the above coloring matter is capable of undergoing reduction, and when the dyestuff is acted upon by sodium sulfid in an aqueous solution, a new compound is formed, which dyes unmordanted cotton in fiery yellowish red shades of excellent fastness to acids.

Example 4: 277 parts of aminazobenzol sulfonic acid are diazotized by means of 69 parts of sodium nitrite and the requisite amount of hydrochloric acid in the ordinary way. This diazo compound is then combined with 372 parts of 2-phenylamino-acetylamino-5-naphthol-7-sulfonic acid of the formula given in Example 1 dissolved in water in the presence of sufficient sodium carbonate to keep the solution alkaline. The resulting dyestuff is salted-out in the usual way. It dyes unmordanted cotton in red shades of good fastness to acids, and alkalis, and of great fastness to light.

If in the place of the 2-phenylamino-acetylamino-5-naphthol-7-sulfonic acid in the preceding example, 417 parts of 2-meta-nitrophenylaminoacetylamino - 5 - naphthol-7-sulfonic acid are used a dyestuff of similar dyeing properties is obtained. If equivalent parts of the ortho tolyl or alpha naphthyl derivatives are used bluer shades are obtained.

Example 5: 199 parts of picraminic acid are diazotized in the usual way by means of 69 parts of sodium nitrite and the necessary amount of hydrochloric acid. The diazo compound is combined with 372 parts of the anilid of 2-amino-8-naphthol-6-sulfonic acid glycin having the constitution $$C_{10}H_5(SO_3H)(OH)NH.CH_2.CO.NH.C_6H_5$$

in the presence of a suitable excess of sodium carbonate. When combination is completed the color is isolated in the usual way. It dyes wool in dark brown black shades, which on afterchroming become dark olive. The afterchromed shades are extremely fast to light, milling and potting.

Example 6: 154 parts of 4-nitro-2-amino phenol are diazotized by means of 69 parts of sodium nitrite and the necessary amount of hydrochloric acid and the resulting diazo compound is combined with 452 parts of the meta-sulfo-anilid of the glycin of 2-amino-8-naphthol-6-sulfonic acid having the constitution

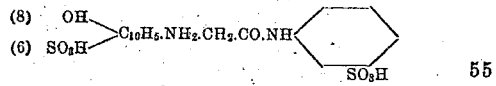

in the presence of an excess of sodium carbonate. When combination is completed the dyestuff is isolated in the usual way. It dyes wool in brown shades which on afterchroming become brown-black and exceedingly fast to light, milling, and potting.

What we claim is:—

1. The production of azo dyestuffs by combining a diazo body of the aromatic series with the component produced by combining halogenacetylchlorid, a primary aromatic amino body, and an amino-naphthol-sulfonic acid which does not contain the amino group in the ortho position to the hydroxyl group, substantially as herein set forth.

2. An azo dyestuff having the general formula

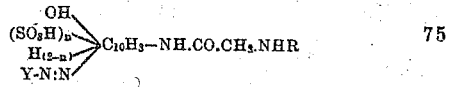

where $n$ indicates a number less than 3, "R" the residue of a primary aromatic amin, and "Y" the residue of the aromatic amin which has been diazotized and coupled with the new component.

In witness whereof we have hereunto set our hands in the presence of two subscribing witnesses.

HERBERT LEVINSTEIN.
JAMES BADDILEY.

Witnesses:
WILLIAM GEO. HEYS,
ERNOLD SIMPSON MOSELEY.